US005914841A

United States Patent [19]

Heo et al.

[11] Patent Number: 5,914,841

[45] Date of Patent: Jun. 22, 1999

[54] CIRCUIT FOR DRIVING MAGNETOSTRICTIVE DEVICE

[75] Inventors: Pil-Woo Heo; Yang-Lae Lee; Jaeheyng Kim; Eui-Su Lim, all of Yoosung-Ku, Rep. of Korea

[73] Assignee: Korea Institute of Machinery & Metals, Daejeon-si, Rep. of Korea

[21] Appl. No.: 09/015,609

[22] Filed: Jan. 29, 1998

[30] Foreign Application Priority Data

Nov. 29, 1997 [KR] Rep. of Korea ...................... 97-64662

[51] Int. Cl.$^{6}$ ...................................................... H02H 7/00

[52] U.S. Cl. .............................................. 361/18; 361/111

[58] Field of Search ................................ 361/18, 56, 58, 361/88, 93, 100, 101, 110, 111; 310/311, 26; 433/86, 118, 119; 323/271, 282, 290, 321, 351, 371, 901, 908; 363/15, 18, 20, 27, 28, 50, 128, 130, 177, 178

[56] References Cited

U.S. PATENT DOCUMENTS

| | | | |
|---|---|---|---|
| 4,255,782 | 3/1981 | Joyce | 363/8 |
| 4,588,917 | 5/1986 | Ratcliff | 310/316 |
| 5,730,594 | 3/1998 | Sharp | 433/119 |

*Primary Examiner*—Ronald W. Leja
*Attorney, Agent, or Firm*—Nikaido, Marmelstein, Murray & Oram, LLP

[57] ABSTRACT

Provided is a circuit for driving a magnetostrictive device including: a high voltage interrupting circuit section for interrupting an instantaneously leaking high voltage depending on the switching operation of a power switch; a voltage storage section for rectifying an input voltage for a half of the positive cycle and storing it; a switching circuit section for supplying the voltage stored in the voltage storage section to the magnetostrictive device; and a voltage discharging circuit section for discharge the voltage remaining in the voltage storage section when the power is interrupted.

5 Claims, 1 Drawing Sheet

CIRCUIT FOR DRIVING MAGNETOSTRICTIVE DEVICE

BACKGROUND OF THE INVENTION

1. Field of the Invention

The present invention relates to a circuit for driving a magnetostrictive device and, particularly, to a circuit for driving a magnetostrictive device by interrupting high voltage instantaneously leaking during a power supply and discharging the remaining voltage with a power interruption, thus supplying power to the magnetostrictive device in a stable manner.

2. Discussion of Related Art

A magnetostrictive device is generally used as an oscillator in sound detector, fish detector, ultrasonic processing machine, ultrasonic cleaner and ultrasonic transmitter. When a current is applied to the coil winding around a magnet, the magnet elastically vibrates according to a specific frequency of the ultrasonic transmitter and by this way the magnetostrictive device generates ultrasonic waves.

A stable operation of the magnetostrictive device requires a stable power supply. A circuit for driving a magnetostrictive device of prior art is however problematic in that the stable operation of the magnetostrictive device might be interrupted since a high voltage instantaneously leaking is applied to the device when the power switch is turned on with a view to supplying power to the device.

SUMMARY OF THE INVENTION

Accordingly, the present invention is directed to a circuit for driving a magnetostrictive device that substantially obviates one or more of the problems due to limitations and disadvantages of the related art.

An object of the present invention is to provide a circuit for driving a magnetostrictive device which is designed to provide a stable power supply to the magnetostrictive device by interrupting a high voltage instantaneously leaking during a power supply and discharging the remaining voltage with power interruption, thus securing a stable operation of the magnetostrictive device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a circuit for driving a magnetostrictive device includes: a high voltage interrupting circuit section for interrupting an instantaneously leaking high voltage depending on the switching operation of a power switch; a voltage storage section for rectifying an input voltage for a half of the positive cycle and storing it; a switching circuit section for supplying the voltage stored in the voltage storage section to the magnetostrictive device; and a voltage discharging circuit section for discharging the voltage remaining in the voltage storage section when the power is interrupted.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 1 is a diagram of the circuit for driving a magnetostrictive device in accordance with the present invention.

DETAILED DESCRIPTION OF PREFERRED EMBODIMENT

Figure 1:
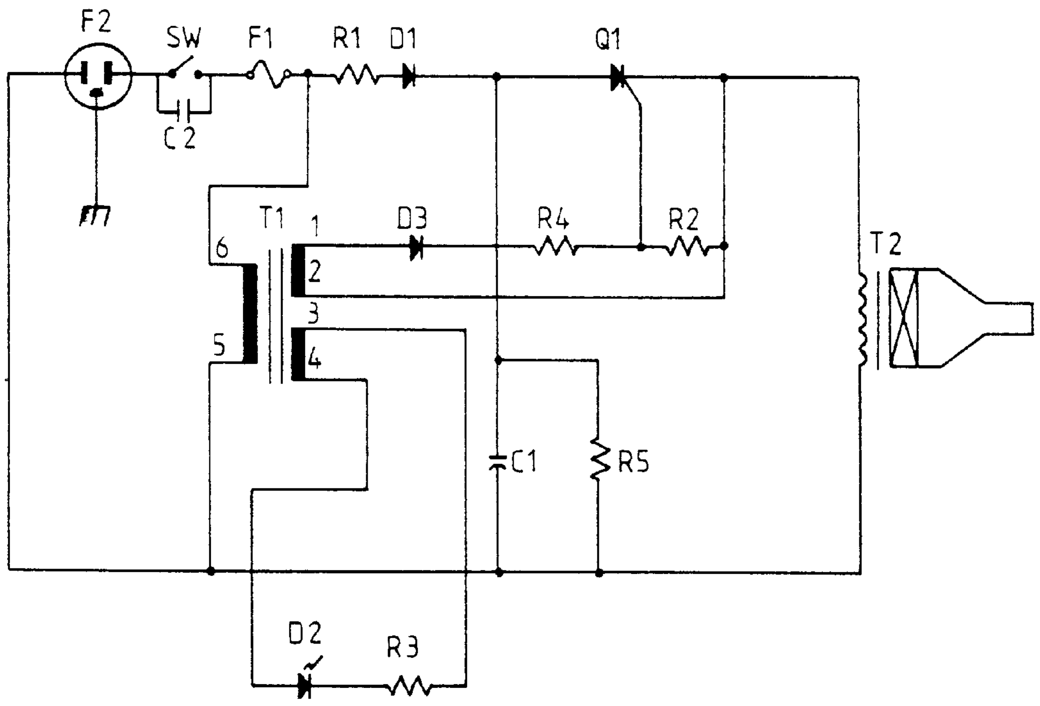

Reference will now be made in detail to the preferred embodiments of the present invention, examples of which are illustrated in the accompanying drawings.

FIG. 1 is a diagram of the circuit for driving a magnetostrictive device according to the present invention.

Referring to FIG. 1, power supply F2 is connected to power switch SW and second capacitor C2 which are linked in parallel to each other, the power switch SW having its output connected to the input of transformer T1 and a first resistance R1 via a fuse F1. The output of the first resistance R1 is connected to the anode of a first diode D1.

The first diode D1 has its cathode connected to the input of SCR (Silicon-Controlled Rectifier) Q1, the one output of transformer T1 connected to the anode of a third diode D3, which has its cathode connected to second and fourth resistances R2 and R4 linked in parallel to each other.

The voltages divided by the second and fourth resistances R2 and R4 are applied to the gate of the SCR Q1, which is connected to the input of magnetostrictive device T2 with its output.

The cathode of the first diode D1 is connected to a first capacitor C1 and a fifth resistance R5, which are linked in parallel with each other, and the other output of the transformer T1 is connected to serial second diode D2 and third resistance R3.

Below is a detailed description of the operation of the circuit for driving a magnetostrictive device as constructed above.

When the power switch SW is "on" in order to drive the magnetostrictive device, voltages are applied to the input of SCR Q1 via the power supply F2. The first resistance R13 and the second capacitor C2 interrupt a high voltage instantaneously leaking during the switching of the power switch SW, so that the voltage rectified by the first diode D1 for a half of the positive cycle is stored in the first capacitor C1.

The third diode D3 rectifies the one of the voltages divided by the transformer T1. The voltage rectified for a half of the positive cycle is divided by the second and fourth resistances R2 and R4 and applied to the gate of the SCR Q1 as a trigger signal.

The trigger signal of 60 Hz equal to the frequency of an input voltage is applied to the gate of the SCR Q1, which is thus turned on, and the voltage stored in the first capacitor C1 is applied to the magnetostrictive device T2 that will be driven.

When the other voltage divided by the transformer T1 is applied to the LED(light-emiting diode) D2, the LED D2 lightened indicates that the power is supplied to the magnetostrictive device T2.

On the contrary, when the power switch SW is open, interrupting the trigger signal applied to the gate of the SCR Q1, the SCR Q1 is turned off to interrupt the voltage applied to the magnetostrictive device through the SCR Q1 and the voltage remaining in the first capacitor C1 is discharged by the fifth resistance R5.

In accordance with an aspect of the present invention, it is easy to control high voltage and large current, with a high control gain, and the power can be supplied to the magnetostrictive device in a stable manner by use of the SCR having an excellent frequency property. In accordance with another aspect of the present invention, the magnetostrictive device can be driven stably by interrupting a high voltage instantaneously leaking during a power supply and discharging the remaining voltage with the power interrupted.

It will be apparent to those skilled in the art that various modifications and variations can be made in the circuit for driving a magnetostrictive device of the present invention without departing from the spirit or scope of the invention. Thus, it is intended that the present invention cover the modifications and variations of this invention provided they come within the scope of the appended claims and their equivalents.

What is claimed is:

1. A circuit for driving a magnetostrictive device, comprising:

a high voltage protecting circuit section, connected to a power supply switch, for protection from an instantaneously leaking voltage when power is turned on by the power supply switch;

a voltage storage section, connected to the high voltage protecting circuit section, for rectifying an input voltage for a positive half cycle and storing it;

a switching circuit section, connected to said voltage storage section, for supplying the voltage stored in the voltage storage section to the magnetostrictive device; and a voltage discharging circuit section, connected in parallel to said voltage storage section, for discharging the voltage remaining in the voltage storage section when power is turned off by the power supply switch.

2. The circuit as defined in claim 1, further comprising a displaying circuit section for indicating whether the power is applied to the magnetostrictive device.

3. The circuit as defined in claim 1, wherein the switching circuit section includes a silicon-controlled rectifier.

4. The circuit as defined in claim 1, further comprising a transformer connected to said power supply switch.

5. The circuit as defined in claim 4, wherein a trigger signal output by said transformer is applied to said switching circuit section for switching said switching circuit section to supply the voltage from the voltage storage section to the magnetostrictive device.

* * * * *